US008296234B2

(12) United States Patent
Karremans

(10) Patent No.: US 8,296,234 B2
(45) Date of Patent: Oct. 23, 2012

(54) METHOD OF AND SYSTEM FOR COMMUNICATING LIABILITY DATA IN A TELECOMMUNICATIONS NETWORK

(75) Inventor: Paulus Karremans, Tilburg (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1192 days.

(21) Appl. No.: 11/721,508

(22) PCT Filed: Dec. 16, 2004

(86) PCT No.: PCT/EP2004/014466
§ 371 (c)(1),
(2), (4) Date: Jun. 12, 2007

(87) PCT Pub. No.: WO2006/063612
PCT Pub. Date: Jun. 22, 2006

(65) Prior Publication Data
US 2009/0299902 A1    Dec. 3, 2009

(51) Int. Cl.
*G06Q 40/00* (2012.01)
(52) U.S. Cl. .................... 705/44; 705/2; 705/3; 705/30; 455/406
(58) Field of Classification Search .................. None
See application file for complete search history.

(56) References Cited

U.S. PATENT DOCUMENTS

| | | | |
|---|---|---|---|
| 6,453,297 B1 * | 9/2002 | Burks et al. ...................... 705/3 |
| 2004/0006489 A1 * | 1/2004 | Bynon ................................ 705/2 |
| 2004/0143521 A1 * | 7/2004 | Barnard et al. .................. 705/30 |
| 2004/0147245 A1 * | 7/2004 | Kastelewicz et al. ......... 455/406 |

FOREIGN PATENT DOCUMENTS

WO    WO99/22330    *    5/1999

OTHER PUBLICATIONS

Mao. On Two Proposals for On-line Bankcard Payments Using Open Networks: Problems and Solution. Proceedings of the IEEE Symposium on Security and Privacy. May 6, 1996.*
Mao, Wenbo. On two Proposals for On-line Bankcard Payments using Open Networks: Problems and Solutions. SP '96 Proceedings of the 1996 IEEE Symposium on Security and Privacy. p. 201.*
Mao W: "On Two Proposals for On-Line Bankcard Payments Using Open Networks: Problems and Solutions" Proceedings IEEE Symposium on Security and Privacy, May 6, 1996, pp. 201-2110, XP000600082 abstract p. 202, col. 2, paragraph 2 - p. 209, col. 1. paragraph 4, figure 2.

* cited by examiner

*Primary Examiner* — Robert Niquette

(57)    ABSTRACT

The present invention relates to a method of and system for managing financial liability in a telecommunications network wherein a service requester (1) receives post paid services provided by a service provider (2) and wherein financial liability of said service requester for payment of said services is certified by a liability provider (3). At least one liability token data signal is received by said service provider via said telecommunications network (8), which at least one liability token data signal is issued e by said liability provider. Said liability token data signal comprises time dependent validity data for said liability token data signal and data regarding an amount for which said service requester is liable. The invention is also related to a liability server for use in a method and system according to the invention.

18 Claims, 2 Drawing Sheets

METHOD OF AND SYSTEM FOR COMMUNICATING LIABILITY DATA IN A TELECOMMUNICATIONS NETWORK

FIELD OF THE INVENTION

The present invention relates to a method of communicating liability data in a telecommunications network wherein a service requester receives post paid services provided by a service provider and wherein financial liability of said service requester for payment of said services is certified by a liability provider.

The present invention further relates to a system for communicating liability data in a telecommunications network arranged for providing post paid services to a service requester by a service provider.

In addition, the invention is related to a liability server for issuing liability token data signals.

BACKGROUND OF THE INVENTION

At present technologies are standardized for opening up telecommunications networks towards Application Service Providers (ASPs) that offer applications to end-users. The driving force behind this is the expectation that a larger offering of applications to the end-users results in a higher traffic load which, in the end, will spur the telecommunication vendor sales.

The ASP can offer services to end-users that are based on or make use of the capabilities and/or resources of the telecommunications network. The ASP can be regarded a Service Requestor (SR): it requests a services derived from or based on capabilities and/or resources in the telecommunications network that are offered by a Network Operator (NO) or Service Provider (SP). Examples of such services are location-based services, presence, messaging, multiparty call control, etc.

In order for an ASP to survive in a market wherein similar services are provided by many other competitors and wherein many service providers offer telecommunications services against continuously differing prices, the ASP requires the flexibility to easily switch from one service provider to another, even on a daily basis if so desired. Although from a technical point of view, switching the taking of services from one service provider to another can be effected by virtually a click of a button, this is not desired without certifying to the new service provider that the service requester to be connected is financially liable to live up to the costs of the service.

This problem is nowadays easily tackled by submitting a liability statement issued by a financial institution, such as a bank or the like. The service requester contacts his bank and requests the bank to issue such a liability statement. The bank, in turn, investigates the financial whereabouts of the service requester and may issue a statement regarding e.g. payment history of the service requester or an amount up to which the service requester is supposed to be liable. The service requester, upon receiving the statement e.g. by mail or facsimile, may provide the statement to the service provider which in turn enables the service requester to use the telecommunications services of the provider. There is a large number of disadvantages with the procedure described above, as will be explained hereinbelow.

A first disadvantage of the above-described procedure is that the liability statement issued by the financial institution only provides information with respect to the liability of the service requester at the moment of time on which the liability statement is issued. The service provider may enable the service requester to use the requested services, however within short time after the provisioning of services has commenced, a change in the liability status of the service requester may make the issued liability statement obsolete and services are provided by the service provider to the service requester without the service requester being liable to pay for these services.

Another problem of the above-mentioned procedure is that it is time consuming, and involves the combined efforts of the financial institution, the service requester and the service provider before the service provisioning can be enabled. Since a rather large number of people are involved in establishing the service as a result of the above-mentioned procedure, the application service provider or service requester is not very flexible to switch from one service provider to another on a daily basis. On the other hand the issuing of liability statements is relatively expensive, while all the service provider needs to know is whether or not the service requester is liable (and continues to be liable) to pay for the requested services.

As a result, the service requester will not be able to provide the service until the liability statement of the financial institution is issued, transmitted and accepted by the service provider. This leads to all kinds of technical problems, e.g. where services are dependent on other services or where customers of the service requester rely on the continuous provisioning of a service by the service requester.

SUMMARY OF THE INVENTION

It is an object of the present invention to provide a means of managing financial liability in a telecommunications network which provides a flexibility and which is fully automated and integrated with the telecommunications network.

These and other objects are achieved by the present invention in that there is provided a method of communicating liability data in a telecommunications network wherein a service requester receives post paid services provided by a service provider and wherein financial liability of said service requester for payment of said services is certified by a liability provider, wherein at least one liability token data signal is received by said service provider via said telecommunications network, which at least one liability token data signal is issued by said liability provider, wherein said liability token data signal comprises time dependent validity data for said liability token data signal and data regarding an amount for which said service requester is liable.

The above method may be easily integrated into a telecommunications network, and provides the ability for a financial institution to automatically issue liability statement in the form of "tokens" that can be transmitted either to the service requester or directly to the service provider, or any other intermediate party. Upon receiving the token, the service provider may directly enable service provisioning to the service requester. It is noted that the wording 'service' is meant as to include individual services, service categories and a plurality of services.

The liability token issued by the liability provider (which may be the financial institution) is valid only temporarily, enabling the liability provider to specify until when or for which period liability can be certified. In addition, the liability token comprises data indicating an amount for which the service requester is liability according to the liability provider. As a result the liability provider may, e.g. indicate that the service requester is liable for an amount of € 1,000,000 for at least three days. In turn the service provider may enable service provisioning to the service requester for three days.

When these three days have lapsed, the liability provider may automatically, or on request of the service requester, issue another liability token indicating a new amount and new validity conditions.

Certifying liability for a certain amount for a certain requester and for a certain period of time may be performed by the liability provider based on payment history of the requester, or alternatively by reserving a certain amount of money or credits from an account for the time period specified in the liability token.

In accordance with an embodiment of the present invention, at least one liability token data signal is issued with a validity of a certain time period, and said time dependent validity data specifies said time period.

Alternatively and according to another embodiment of the present invention at least one liability token data signal is issued with a validity until a certain point in time, and said time dependent validity data specifies said point in time.

It will be appreciated that the above two embodiments of the present invention provide straightforward implementations of the principle of time dependent validity of liability tokens.

As mentioned above, the liability token data signal may be transmitted by the liability provider to the service requester, which forwards the liability token data signal to the service provider, or alternatively may be transmitted by the liability provider directly to the service provider or to a third party acting as an intermediate between the service provider and the service requester, e.g. a service broker.

In addition, the service provider may validate the received liability token data signal, either based on data contained in the liability token data signal such as a verification code, signature, or the like or alternatively may contact the liability provider for verification. As will be appreciated contacting the liability provider by the service provider may be done electronically, e.g. automatically in response to the received liability token data signal, and may include the comparison of the received token with an original or may include other verifications measures.

In addition to the above, the liability provider may determine a liability level for a certain amount, and said at least one liability token data signal comprises data regarding the liability level. As an example, the liability provider may include in the liability token data signal, data indicating that the service requester's liability is certified up to an amount of € 1,000,000 for five days and that an acceptable risk is taken if the service requester is granted service provisioning up to a level of € 1,500,000 for this time period.

It will be understood that as soon as the validity of the received liability token data signal has expired, a new liability token data signal may automatically be issued by the liability provider in order to guarantee continuity in the service provisioning.

According to another embodiment of the present invention said liability provider issues a recall token data signal in dependence of changes of said in said financial liability of said service requester, for recalling an issued liability token data signal before expiry of said validity of said liability token data signal.

This option can be used when the financial liability of the service requester suddenly changes, or for any other suitable reason. As an example, in case of a financial calamity at the address of the service requester, e.g. bankruptcy, an earlier issued liability token may not yet have expired, enabling the service requester to continue using the services of the service provider. However as a result of the bankruptcy, the service requester is not liable anymore and in order to reduce damages service provisioning should be seized as soon as possible. This may be triggered by the liability provider by sending a recall token which recalls the issued liability token data signal before expiry of the validity thereof. As a result the original liability token is rendered preliminary invalid and the service provisioning will seize.

In another embodiment of the present invention the liability token data signal further comprises at least one of a group comprising time data of moment of issuance of the token data signal, identity of the liability provider and/or identity of the service requester, signature of the liability provider, identification of at least one service to which the liability token is applicable.

In particular, including the identity of the liability provider or a signature of the liability provider, the authenticity of the liability token data signal may be established. The liability token data signal may also include a verification code in order to verify the data included therein. The verification code may for instance be a coded representation of the data comprised in the token data signal.

In addition to this, by including an identification of at least one service to which the liability token data signal is applicable, the token data signal may be issued for providing a specific service or specific services, or may be issued generally for all services provided by the service provider. It will be appreciated that the costs involved in providing a service varies from service to service and it may be possible that a service requester is liable for small amounts for the provisioning of some more basic services, but is not liable for larger amounts involved in the service provisioning of other services. A specific service choice may be made by the service requester or may be advised by the liability provider.

According to another aspect of the present invention, there is provided a system for communicating liability data in a telecommunications network arranged for providing post paid services to a application service provider by a network operator, said system comprising a liability server arranged for providing liability token data signals for certifying financial liability of said application service provider by a liability provider for payment of said services, wherein said liability server is further arranged for transmitting said liability token data signals via said telecommunications network, said system further comprising a service provisioning server arranged for providing said services in dependence of data comprised in said liability token data signals and for receiving said liability token data signals, wherein said liability server is arranged for including liability data in each of said liability token data signals, said liability data comprising time dependent validity data for said liability token data signal and data regarding an amount for which said application service provider is liable.

In an embodiment of this second aspect of the present invention, said liability server is further arranged for issuing recall tokens for recalling an issued liability token before expiry of said validity of said liability token.

In accordance with a third aspect of the present invention, there is provided a liability server for issuing liability token data signals for carrying out a method according to the invention, said liability server comprising means for acquiring data regarding an amount for which a service requester is liable for payment of services requested from a service provider by said service requester, means for acquiring time dependent validity data of said data regarding financial liability, processing means for generating said liability token data signals via comprising said time dependent validity data and said data regarding said amount, and means for transmitting said liability token data signals via said telecommunications network.

The present invention will now be further elucidated by a description and drawings referring to a preferred embodiment thereof. It is noted that the invention is not limited to the embodiments disclosed, which are provided for explanatory purposes only.

DETAILED DESCRIPTION OF THE DRAWINGS

Figure 1:
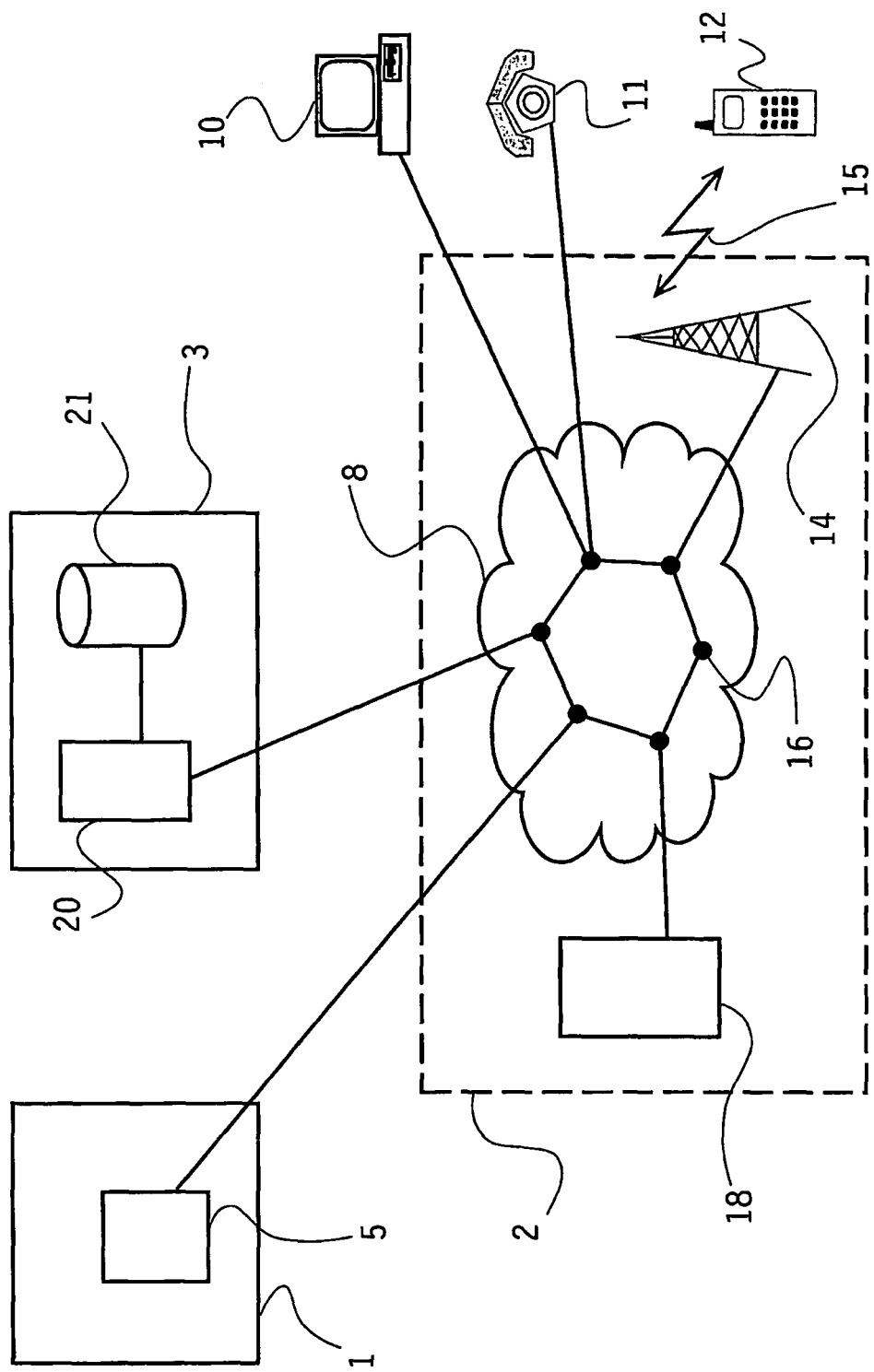
FIG. 1 is a schematic illustration of a system in accordance with the present invention.

In FIG. 1 a service provider 2 manages, controls or exploits a telecommunications network schematically indicated by reference number 8, said network 8 comprising a plurality of interconnected notes 16. The telecommunications network 8 may be a stand-alone network or may be interconnected with further telecommunications networks. Users of the telecommunications network may be of private of corporate nature, and may access the network using a number of different types of customer premise equipment known to the skilled reader, such as a personal computer 10, regular wireline telecommunications means 11 or mobile telecommunications means such as mobile phone 12 connecting to the network via a wireless connection 15 with a base station via antenna 14 connected to a network node.

Application based services may be provided to the users of the telecommunications network 8. These application based services will often be provided by independent application service providers (such as application service provider 1), which may be individual entities being legally and/or commercially independent from the network operator/service provider 2. Hereinafter, in particular for clarity purposes, application service providers will be referred to as service requesters, whilst (telecommunications) service providers such as service provider 2 will be referred to as service provider.

At the service providers premises, connected to a node on the telecommunications network 8, a service provisioning server 18 manages the provisioning of telecommunications services 2, e.g. to all kind of service requesters such as service requester 1. As soon as service requester 1 is enabled to use telecommunications services offered by service provider 2, access to these telecommunications services will be provided by the service provisioning server 18 to the service requester 1. An application server 5 running at the premises of the service requester is connected to the telecommunications network and may offer the application services to the users of the telecommunications network via the customer premise equipment of these users, such as personal computer 10, wireline telephone 11 or mobile phone 12.

Numerous service providers such as service provider 2 offering telecommunications services to service requesters such as service requester 1 are nowadays available to service requesters. Therefore service requester 1 may regularly switch from one service provider to another service provider for offering the application service to its customers. If service requester 1 would, for example, switch from service provider 2 to a different service provider (not shown), telecommunications traffic to and from customer premise equipment 10, 11 and 12 may be transmitted via a back to back interconnection (not shown) between service provider 2 and the new service provider (not shown) to the application service provider 1.

The use of liability tokens which are electronically provided by the liability provider 3, in accordance with the invention, will provide sufficient flexibility to the process of change from one service provider to another for enabling the service requester to change service provider within half a day or even faster, as will be explained below. It will be appreciated that before service requester 1 will be enabled access to the telecommunications services provided by service provider 2, service provider 2 wants to know whether or not service requester 1 is liable. Conventionally, this may easily be verified by requesting a liability statement from a trusted financial institution indicating the liability of the service requester for payment of the requested services. However it will be appreciated that the issuing of a liability statement and the processing in each of the organisations of the liability provider 3, the service provider 2 and the service requester 1 takes time and makes the switching of telecommunications service offering from one service provider (2) to another service provider rather slow. In the worst case errors will occur that will lead to interruption of services to the customers of the service requester 1.

In the present invention, the liability provider 3, e.g. a financial institution managing (at least parts of) the financial whereabouts of service requester 1, is connected to the telecommunications network 8. In particular, the liability provider may comprise financial systems or a database 21 wherein up to date information of the financial status of service requester 1 is available. Database 21 may be connected to a liability server 20 generating liability token data signal (hereinafter shortly referred to as tokens). A liability token, in accordance with the invention, is an electronic liability statement having a time dependent validity (e.g. valid for one or more days, a week, a month or the like) for a certain amount of money. These tokens, generated by the liability server 20, are forwarded to the service provider 2, which upon receipt of the tokens may enable service provisioning to the service requester 1. A token may be generated at a request of the service provider 2 or at a request of the service requester 1 by the liability provider 3. It will be understood that as soon as an issued liability token has expired, or shortly before expiry, the liability provider 3 may provide a further liability token specifying an amount and a time dependent validity. This process may be conducted automatically, or each time upon request of any of the parties involved.

Note that the first liability token provided by liability provider 3, is triggered by a service request of the service requester 1 to the service provider 2. For convenience, the exchange of additional information and the conducting of administrative procedures, which does not form part of the invention, will not be described here. It is however noted that such procedures may be automated as well, such that the whole procedure of changing from one service provider to another service provider may be performed automatically.

Once the service is up and running, it may be continued after expiry of a first liability token provided by the liability provider 3, by providing a further liability token. Note that a sequence of liability tokens may be provided this way for providing continued service to the service requester 1. Tokens belonging to a certain sequence for providing a continued service may comprise a sequence number specifying the sequence of liability token data signal to which they belong.

The method of the present invention is applicable to both pre paid and post paid services. For pre paid services, the liability tokens may be used for replenishing a pre paid account of the service requester 1 for providing said services.

Figure 2:
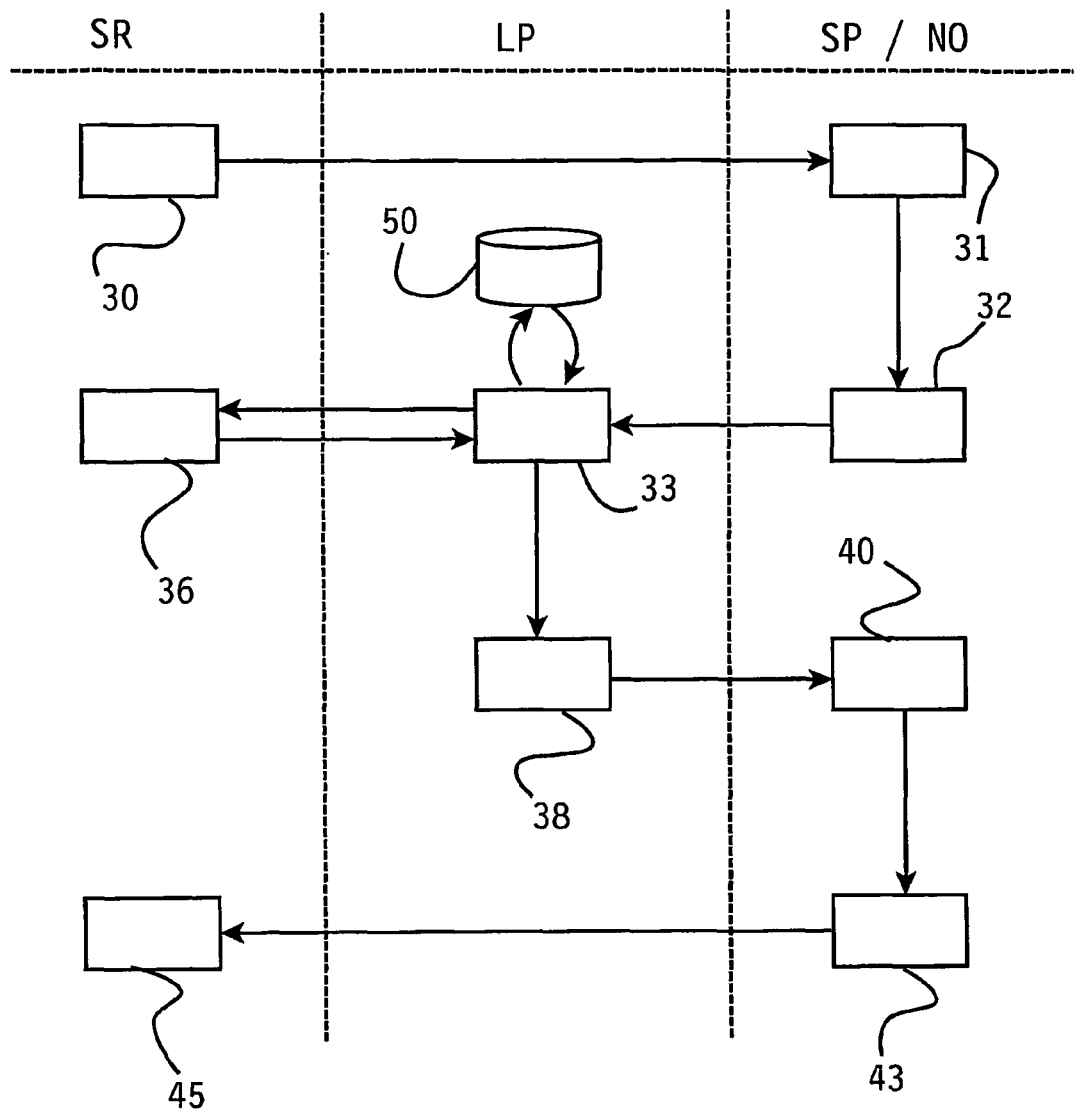
FIG. 2 schematically illustrates the method of the present invention.

In FIG. 2, the handling of a service request in accordance with the present invention is indicated schematically. Each of the method steps is performed by any of the three parties involved as indicated by the columns shown. The indication 'SR' refers to service requester, and all method steps in the first column are performed by the service requester. The middle column refers to the liability provider, shortly indicated by 'LP'. The column on the right indicates the method steps performed by the service provider or network operator, and is schematically indicated as 'SP/NO'.

A service request 30 is initiated by the service requester and is forwarded to the service provider or network operator. The service provider will preprocess the service request (step 31) and may request (32) a liability statement. The request 32 for liability statement is forwarded to the liability provider by the service provider. It is however noted that the liability statement may indirectly be requested by the service provider via the service requester, which forwards this request to the liability provider.

The liability provider will verify in step 33 whether or not the service provider is allowed to receive liability statements for the service requester. The liability provider may therefore contact the service requester and service requester may forward a confirmation (step 36) to the liability provider.

Alternatively the information on whether or not a service provider is allowed to receive liability statement for a service requester may be stored in a database 50 at the premises of the liability provider. This would for example be the case where liability tokens are forwarded to a service provider on a regular basis, or where the tokens are provided subsequently for continued provisioning of a running service to the service requester.

As soon as a confirmation has been received or entitlement has been verified, the liability provider may investigate the liability of the service requester and may issue a liability token data signal in step 38. Alternatively the liability provider may for example reserve a certain amount of money from a bank account of the service requester for a predetermined period of time, and may specify the reserved amount and the time period for which the amount is reserved in the liability token. The liability token is forwarded to the service provider/network operator. Upon receipt of the liability token, the service provider may automatically conduct the technical preparations for enabling service provisioning (step 40). Subsequently in step 43, the service provider will notify the service requester that access to the telecommunications services is granted (step 43). In step 45, the service requester will initiate offering application services to its customers using the new service provider.

For the purpose of comprehensiveness, it is noted here that numerous modifications and variations of the present invention are possible in the light of the above teachings. It is therefore understood that, within the scope of the appended claims the invention may be practised otherwise than as specifically described herein.

The invention claimed is:

1. A method in a telecommunications network for enabling an application service provider initially obtaining telecommunication services from a first network operator to rapidly switch and obtain the telecommunication services from a second network operator, wherein the application service provider provides end-user services to end users and must pay the network operators for telecommunication services utilized to deliver the end-user services to the end users, wherein as a prerequisite for obtaining the telecommunication services from the second network operator, the application service provider must provide the second network operator with evidence of the application service provider's financial responsibility, the method comprising the steps of:

providing from the application service provider to a liability provider, current information regarding the ability of the application service provider to pay for telecommunication services;

receiving by a server at the second network operator, a request from the application service provider for the telecommunication services;

sending from the second network operator server to a liability server at the liability provider, a request to verify the ability of the application service provider to pay for the requested telecommunication services following delivery of the services; and receiving by the second network operator server via the telecommunications network, a liability token data signal issued by the liability server, wherein the liability token data signal includes time-dependent validity data for the liability token data signal and a certification by the liability provider guaranteeing payment of a first monetary amount for which the application service provider is liable.

2. The method according to claim 1, wherein the liability server issues the liability token data signal with a validity of a certain time period, and wherein the time-dependent validity data specifies the time period.

3. The method according to claim 1, wherein the liability server issues the liability token data signal with a validity until a certain point in time, and wherein the time-dependent validity data specifies the point in time.

4. The method according to claim 1, wherein the liability server transmits the liability token data signal to the application service provider, and the application service provider forwards the liability token data signal to the second network operator server.

5. The method according to claim 1, wherein the liability server transmits the liability token data signal directly to the second network operator server.

6. The method according to claim 1, wherein the liability server subsequently issues additional liability token data signals when the liability token data signal expires and the application service provider provides the liability provider with updated information regarding the ability of the application service provider to pay for telecommunication services, for continuing certification of the liability of the application service provider.

7. The method according to claim 1, wherein the liability server reserves payment for the services based on the time-dependent validity data or the data regarding the monetary amount for which the application service provider is liable.

8. The method according to claim 1, further comprising verifying by the second network operator server, authenticity of the data contained in the liability token data signal.

9. The method according to claim 8, wherein the liability token data signal further comprises verification data for verification of the data.

10. The method according to claim 1, wherein the liability server issues a recall token data signal upon determining the financial liability of the application service provider has changed, for recalling an issued liability token data signal before expiry of the validity of the liability token data signal.

11. The method according to claim 1, wherein the liability token data signal also includes at least one of a group consisting of:

a time of issuance of the token data signal;
an identity of the liability provider;
an identity of the application service provider;
a signature of the liability provider;

an identification of at least one service to which the liability token is applicable; and
a sequence number.

12. The method according to claim 1, wherein the liability token data signal entitles the second network operator to transfer an amount of money in return for the services provided while the liability token data signal is valid, the amount of money being at most equal to the monetary amount for which the application service provider is liable indicated by the liability token data signal.

13. The method according to claim 1, wherein when the application service provider changes to a new third network operator to obtain telecommunication services, the liability server sends a liability token data signal to a server at the third network operator.

14. A system in a telecommunications network for enabling an application service provider initially obtaining telecommunication services from a first network operator to rapidly switch and obtain the telecommunication services from a second network operator, wherein the application service provider provides end-user services to end users and must pay the network operators for telecommunication services utilized to deliver the end-user services to the end users, wherein as a prerequisite for obtaining the telecommunication services from the second network operator, the application service provider must provide the second network operator with evidence of the application service provider's financial responsibility, the system comprising:
  a liability server at a liability provider configured to receive from the application service provider, current information regarding the ability of the application service provider to pay for telecommunication services, wherein the server stores the information in a non-transitory memory; and
  a server at the second network operator configured to:
    receive a request from the application service provider for the telecommunication services;
    send to the liability server at the liability provider, a request to verify the ability of the application service provider to pay for the requested telecommunication services following delivery of the services; and
    receive via the telecommunications network, a liability token data signal issued by the liability server, wherein the liability token data signal includes time-dependent validity data for the liability token data signal and a certification by the liability provider guaranteeing payment of a first monetary amount for which the application service provider is liable.

15. The system according to claim 14, wherein the liability server is also configured to issue recall tokens for recalling an issued liability token when the financial liability of the application service provider changes before expiry of the validity of the liability token.

16. The system according to claim 14, wherein the liability server is also configured to confirm that the second network operator is allowed to receive liability tokens for the application service provider prior to sending the liability token data signal to the second network operator server.

17. The method according to claim 1, wherein the liability token data signal also includes information identifying a level of risk in providing the application service provider with telecommunication services having a value up to a higher, second monetary amount.

18. The system according to claim 14, wherein the liability token data signal also includes information identifying a level of risk in providing the application service provider with telecommunication services having a value up to a higher, second monetary amount.

* * * * *

UNITED STATES PATENT AND TRADEMARK OFFICE
CERTIFICATE OF CORRECTION

PATENT NO. : 8,296,234 B2  
APPLICATION NO. : 11/721508  
DATED : October 23, 2012  
INVENTOR(S) : Karremans Page 1 of 1

It is certified that error appears in the above-identified patent and that said Letters Patent is hereby corrected as shown below:

On the Title Page, Item (57), under "ABSTRACT", in Column 2, Line 9, delete "e by" and insert -- by --, therefor.

In the Specifications:

In Column 4, Line 64, delete "signals via" and insert -- signals --, therefor.

In the Claims:

In Column 9, Line 12, in Claim 13, delete "a new" and insert -- a --, therefor.

Signed and Sealed this  
Eighteenth Day of June, 2013

Teresa Stanek Rea  
*Acting Director of the United States Patent and Trademark Office*